(12) United States Patent
Tsukada et al.

(10) Patent No.: US 11,982,889 B2
(45) Date of Patent: May 14, 2024

(54) LIQUID CRYSTAL DISPLAY DEVICE AND ASSEMBLY METHOD OF LIQUID CRYSTAL DISPLAY DEVICE

(71) Applicant: DENSO TEN Limited, Kobe (JP)

(72) Inventors: Takahiro Tsukada, Kobe (JP); Kiyoshi Takeno, Kobe (JP); Shogo Fuchisaki, Kobe (JP); Keiji Nebiki, Kobe (JP); Takeshi Yasuda, Kobe (JP); Haruya Tsugimoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 267 days.

(21) Appl. No.: 17/438,192

(22) PCT Filed: Oct. 12, 2020

(86) PCT No.: PCT/JP2020/038529
§ 371 (c)(1),
(2) Date: Sep. 10, 2021

(87) PCT Pub. No.: WO2022/079775
PCT Pub. Date: Apr. 21, 2022

(65) Prior Publication Data
US 2022/0308374 A1 Sep. 29, 2022

(51) Int. Cl.
G02F 1/1333 (2006.01)
G02F 1/135 (2006.01)
G02F 1/136 (2006.01)

(52) U.S. Cl.
CPC .................................. *G02F 1/1333* (2013.01)

(58) Field of Classification Search
CPC ......... G02F 1/1333; G02F 1/135; G02F 1/136
See application file for complete search history.

(56) References Cited

U.S. PATENT DOCUMENTS

| | | | |
|---|---|---|---|
| 2002/0003592 A1 | 1/2002 | Hett et al. | |
| 2005/0036888 A1* | 2/2005 | Miyazaki | F03D 7/0236 416/132 B |
| 2008/0297679 A1 | 12/2008 | Jung et al. | |
| 2011/0235364 A1* | 9/2011 | Lo | G06F 3/041 445/24 |
| 2013/0208510 A1 | 8/2013 | Takashima et al. | |
| 2014/0055705 A1* | 2/2014 | Yu | G02F 1/1333 349/58 |

FOREIGN PATENT DOCUMENTS

| | | |
|---|---|---|
| CN | 207037276 U | 2/2018 |
| CN | 210244016 U | 4/2020 |
| JP | 2004-258291 A | 9/2004 |
| JP | 2009-229964 A | 10/2009 |
| JP | 2015-034876 A | 2/2015 |

* cited by examiner

Primary Examiner — Lucy P Chien
(74) Attorney, Agent, or Firm — Oliff PLC

(57) ABSTRACT

A liquid crystal display device includes a liquid-crystal display module, a holder, an exterior panel, and a fixing part. The liquid-crystal display module includes the liquid-crystal panel and a polarizing plate. The holder holds a back light that is glued to a back surface of the liquid-crystal display module. The exterior panel surrounds a periphery of the liquid-crystal display module. The fixing part fixes the holder and the exterior panel to each other in a part where a straight line and a periphery portion of the holder intersect with each other, the straight line extending in a direction that is different from a light-transmission-axis direction of the polarizing plate.

10 Claims, 6 Drawing Sheets

LIQUID CRYSTAL DISPLAY DEVICE AND ASSEMBLY METHOD OF LIQUID CRYSTAL DISPLAY DEVICE

CROSS-REFERENCE TO RELATED APPLICATIONS

This application is national stage application of International Application No. PCT/JP2020/038529, filed on Oct. 12, 2020, which designates the United States, the entire contents of which are incorporated herein by reference.

FIELD

The embodiment discussed herein is directed to a liquid crystal display device and an assembly method of the liquid crystal display device.

BACKGROUND

There has been known a liquid crystal display device that includes a liquid-crystal panel, a holder that holds a back light glued to a back surface of the liquid-crystal panel, and an exterior panel that surrounds a periphery of the liquid-crystal panel, and in which the holder and the exterior panel are screwed and clamped in a periphery portion of the holder (see Japanese Laid-open Patent Publication No. 2015-034876, for example). When not displaying information, the liquid crystal display device controls liquid crystal and shades light emitted from the back light in a state where the back light is turned on, so as to display a black screen.

SUMMARY

Technical Problem

However, a liquid crystal display device has possibility that strain occurs in a liquid-crystal panel depending on a position of a fixing part in which the holder and the exterior panel are screwed and clamped to each other, and display unevenness occurs when a black screen is displayed.

Solution to Problem

A liquid crystal display device according to one aspect of an embodiment includes a liquid-crystal display module, a holder, an exterior panel, and a fixing part. The liquid-crystal display module includes the liquid-crystal panel and a polarizing plate. The holder holds a back light that is glued to a back surface of the liquid-crystal display module. The exterior panel surrounds a periphery of the liquid-crystal display module. The fixing part fixes the holder and the exterior panel to each other in a part where a straight line and a periphery portion of the holder intersect with each other, the straight line extending in a direction that is different from a light-transmission-axis direction of the polarizing plate.

DESCRIPTION OF EMBODIMENTS

Hereinafter, an embodiment of a liquid crystal display device and an assembly method of the liquid crystal display device will be described in detail with reference to the accompanying drawings. Moreover, the disclosed technology is not limited to the embodiment described below.

Figure 1:
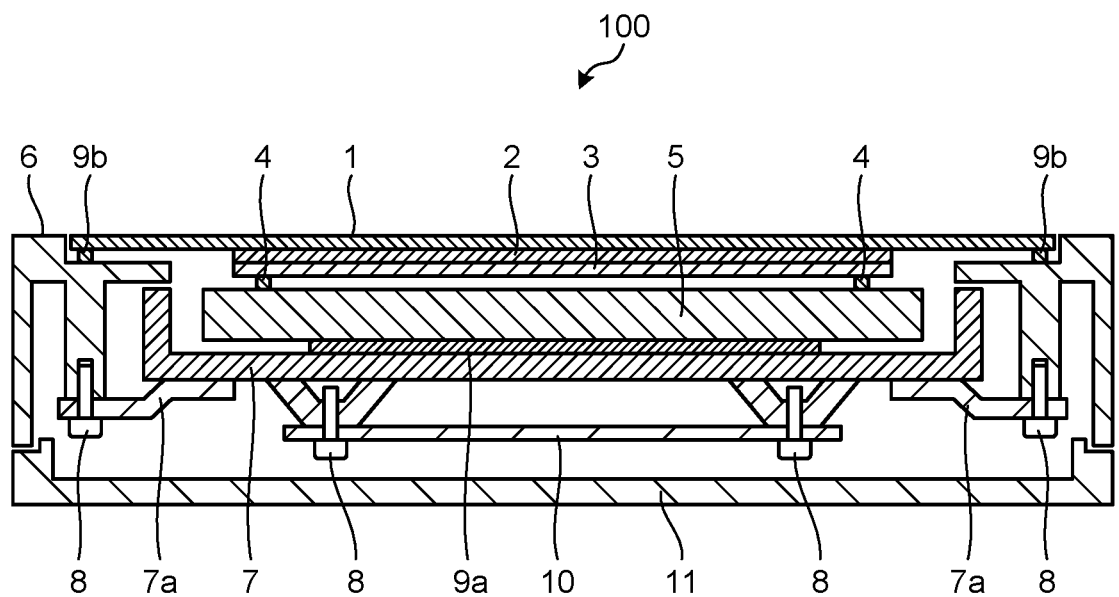
FIG. 1 is a side-cross-sectional view illustrating a liquid crystal display device according to an embodiment.

FIG. 1 is a side-cross-sectional view illustrating a liquid crystal display device according to an embodiment. Hereinafter, a side of the liquid crystal display device on which an image is displayed is defined as a front surface, and an opposite side of the front surface is defined as a back surface. As illustrated in FIG. 1, a liquid crystal display device 100 includes a cover glass 1, a transparent adhesive layer 2, a liquid-crystal display module 3, a cushion-base-material double sided tape 4, a back light 5, an exterior panel 6, a holder 7, fixing plates 7a, screws 8, adhesive layers 9a and 9b, a substrate 10, and a back-surface panel 11.

The holder 7 holds the back light 5 that is placed thereon via the adhesive layer 9a. The holder 7 is a member having a high rigidity, which is formed by sheet metal processing, die casting, or engineering plastics among other things. The substrate 10 is fixed, by the screws 8, to a side of the holder 7 opposite to a side on which the back light 5 is placed. A drive circuit and the like that drives the back light 5 and the liquid-crystal display module 3 is provided to the substrate 10.

The liquid-crystal display module 3 is provided to a front side of the back light 5 via the cushion-base-material double sided tape 4 that is pasted so as to surround a light emitting region of the back light 5. The cover glass 1 is glued to a front side of the liquid-crystal display module 3 via the transparent adhesive layer 2 that is arranged on a display region.

The exterior panel 6 is attached to the holder 7, which surrounds a circumference of the liquid-crystal display module 3. The holder 7 and the exterior panel 6 are fastened to each other by the screws 8. Specifically, on a periphery portion of a back surface of the holder 7, the fixing plates 7a are provided each of which includes holes into which male screw portions of the screws 8 are inserted. On a back surface of a periphery portion of an opening in the exterior panel 6, via which the back light 5 is stored, female screw portions are provided which are screwed to male screw portions of the screws 8.

Male screw portions of the screws 8 that are inserted into the fixing plates 7a and female screw portions of the exterior panel 6 are screwed to each other so as to fix the holder 7 and the exterior panel 6 to each other. Thus, the holder 7 and the exterior panel 6 are stiffly fixed to each other without misalignment. Thus, in the liquid crystal display device 100, the fixing plates 7a, female screw portions of the exterior panel 6, and the screws 8 are fixing parts that fix the holder 7 and the exterior panel 6 to each other.

The fixing plate 7a may be integrally formed with the holder 7, or may be separately provided from the holder 7. If the fixing plate 7a and the holder 7 are integrally formed, the number of components is reduced. Thus, the manufacturing cost of the liquid crystal display device 100 is reduced. On the other hand, if the fixing plate 7a and the holder 7 are separately formed, the holder 7 is able to be formed by using a die whose structure is simple.

In a state where the holder 7 and the exterior panel 6 are fixed to each other, a front of a periphery portion of the opening of the exterior panel 6 via which the back light 5 is stored, and a back surface of a periphery portion of the cover glass 1 are glued to each other by the adhesive layer 9b. The back-surface panel 11 is attached to a back surface of the exterior panel 6.

In the liquid crystal display device 100 illustrated in FIG. 1, strain occurs, in some cases, in the liquid-crystal panel depending on a position of a fixing part in which the holder 7 and the exterior panel 6 are screwed and clamped to each other, thereby leading to occurrence of display unevenness when a black screen is displayed.

Figure 2:
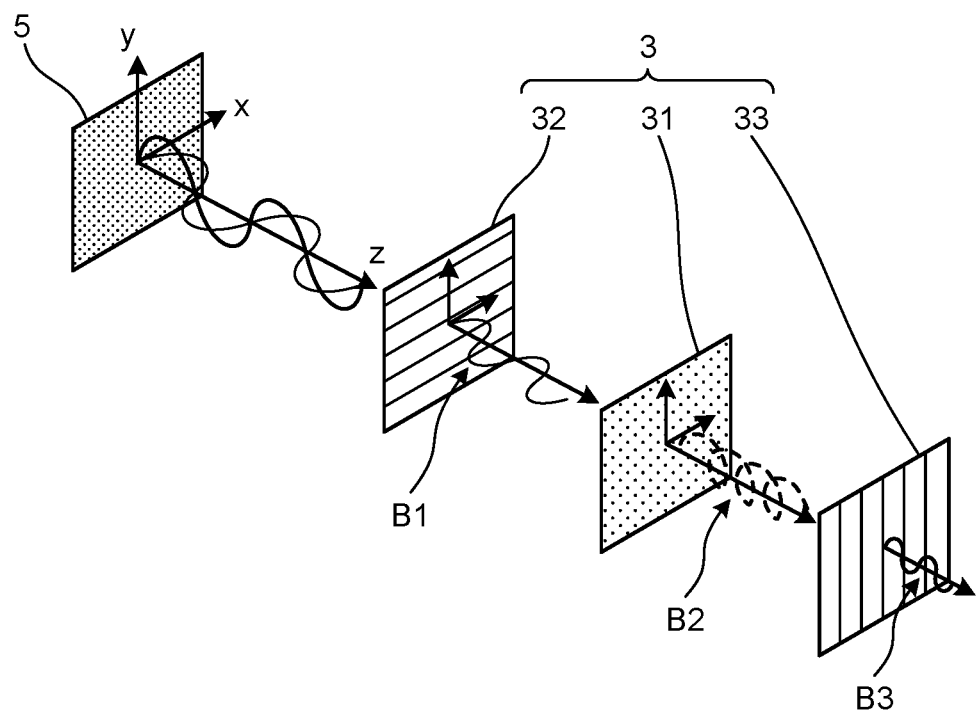
FIG. 2 is a diagram illustrating occurrence of display unevenness.
Figure 3:
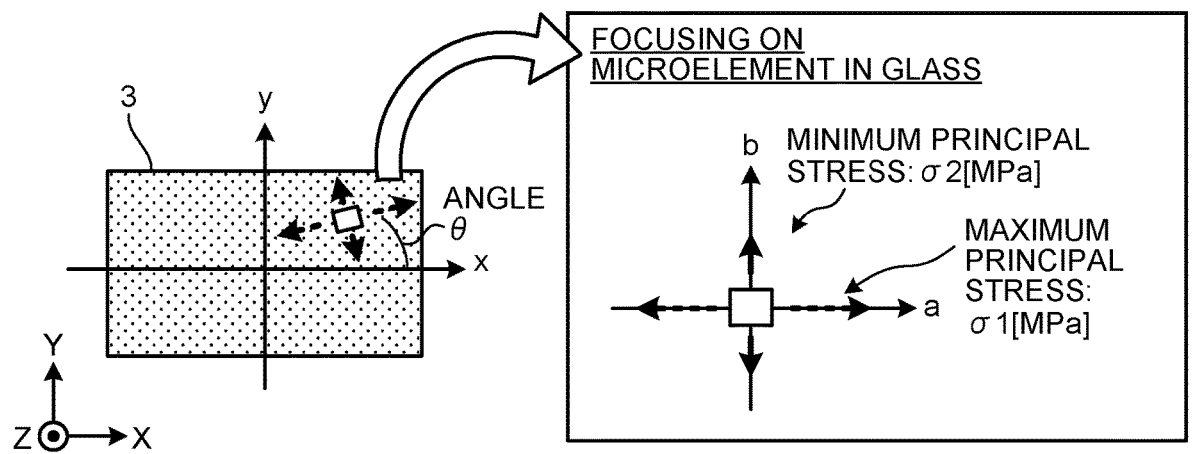
FIG. 3 is a front view illustrating a liquid-crystal panel.

Herein, a mechanism of occurrence of display unevenness will be explained with reference to FIGS. 2 and 3. FIG. 2 is a diagram illustrating occurrence of display unevenness. FIG. 3 is a front view illustrating the liquid-crystal panel.

As illustrated in FIG. 2, the liquid-crystal display module 3 includes a liquid-crystal panel 31, a back polarizing plate 32 that is bonded to a back surface of the liquid-crystal panel 31, and a front polarizing plate 33 that is bonded to a front surface of the liquid-crystal panel 31. A light-transmission-axis direction of the back polarizing plate 32 is perpendicular to a light-transmission-axis direction of the front polarizing plate 33.

Due to a photoelastic effect caused by a stress force having occurred in a glass substrate of the liquid-crystal panel 31, linearly polarized light B1 transmitted by the back polarizing plate 32 becomes elliptically polarized light B2, and thus light B3 to be shut is transmitted by the front polarizing plate 33, thereby leading to occurrence of display unevenness in a liquid-crystal black screen.

Polarization change due to a photoelastic effect may be easily calculated by the following principle. As illustrated in FIG. 3, in a plane perpendicular to a z-axis, a stress force occurring in a glass substrate in the liquid-crystal panel 31 is decomposed into a maximum principal stress force σ1 and a minimum principal stress force σ2, and a direction of σ1 is defined an a-axis and a direction of σ2 is defined an b-axis. Due to a photoelastic effect, a phase difference δ [rad] described as blow occurs between directions of the a-axis and the b-axis in light transmitted by the glass substrate.

$$\delta = \frac{2\pi d}{\lambda} C(\sigma_1 - \sigma_2) \quad (1)$$

C: photoelastic coefficient [nm/MPa/mm]

d: stress affected thickness [mm]

λ: wavelength of light [nm]

An electric field vector of the linearly polarized light B1 in an x-direction which is transmitted by the back polarizing plate 32 may be indicated by the following formula. For sake of simplicity, a sine wave of a time history change at z=0 is exemplified.

$$E_{x-y} = \begin{bmatrix} E_x \\ E_y \end{bmatrix} = \begin{bmatrix} E_0 \cdot \sin(\omega t) \\ 0 \end{bmatrix} \quad (2)$$

$E0$: initial electric-field amplitude $\omega t$: phase at time point $t$

An angle between an x-axis and the a-axis is defined as θ. The linearly polarized light B1 in the x-direction is decomposed into an a-axis direction component and a b-axis direction component, and the relative phase difference δ occurs in a b-component with respect to an a-component, the following formula is obtained.

$$\begin{bmatrix} E_a \\ E_b \end{bmatrix} = E_0 \begin{bmatrix} \cos\theta \cdot \sin(\omega t) \\ -\sin\theta \cdot \sin(\omega t) \end{bmatrix} \xrightarrow[\text{difference}]{\substack{\text{occurrence} \\ \text{of phase}}} E_0 \begin{bmatrix} \cos\theta \cdot \sin(\omega t) \\ -\sin\theta \cdot \sin(\omega t - \delta) \end{bmatrix} \quad (3)$$

If the formula is returned to the original X-Y coordinate system, the following formula is obtained.

$$\begin{bmatrix} E_x \\ E_y \end{bmatrix} = E_0 \begin{bmatrix} \cos^2\theta\sin(\omega t) + \sin^2\theta\sin(\omega t - \delta) \\ \cos\theta\sin\theta\sin(\omega t) - \cos\theta\sin\theta\sin(\omega t - \delta) \end{bmatrix} \quad (4)$$

An intensity I of light is proportional to a time average of the square of an electric-field amplitude. The light B3 penetrates through the front polarizing plate 33 is a y-direction component, and thus the following formula is obtained.

$$E_y^2 = E_0^2(\cos\theta\sin\theta\sin(\omega t) - \cos\theta\sin\theta\sin(\omega t - \delta))^2 \quad (5)$$

$$= E_0^2 \sin^2(2\theta)\sin^2\left(\frac{\delta}{2}\right) \cos^2\left(\omega t - \frac{\delta}{2}\right) \xrightarrow[\text{average}]{\text{time}} I \propto \sin^2(2\theta)\sin^2\left(\frac{\delta}{2}\right)$$

An intensity (luminance) of the light B3 that leaks from the front polarizing plate 33 due to a stress force in the liquid-crystal panel 31 is the maximum when a principal-stress-force direction θ is 45°, and is zero when the principal-stress-force direction θ is 0° or 90°.

In other words, the liquid-crystal display module 3 does not allow the light B3 to leak when a black screen is displayed even in a case where there is applied a stress force for expanding and contracting the liquid-crystal display module 3 in light-transmission-axis directions of the back polarizing plate 32 and the front polarizing plate 33 or for curving the liquid-crystal display module 3 with the light-transmission-axis directions being ridgelines, and thus display unevenness does not occur.

Thus, the liquid-crystal display module 3 is capable of suppressing at least expansion and contraction thereof in a direction that is different from light-transmission-axis directions and curving thereof with the light-transmission-axis directions being ridgelines, so that it is possible to reduce display unevenness.

Preferably, in the liquid-crystal display module 3, the exterior panel 6 and the holder 7 having a high rigidity are coupled to each other in a part where change in a 45°±5° (appropriate value is 45° direction with respect to a light transmission axis is reduced, so that it is possible to effectively reduce display unevenness.

Figure 4:
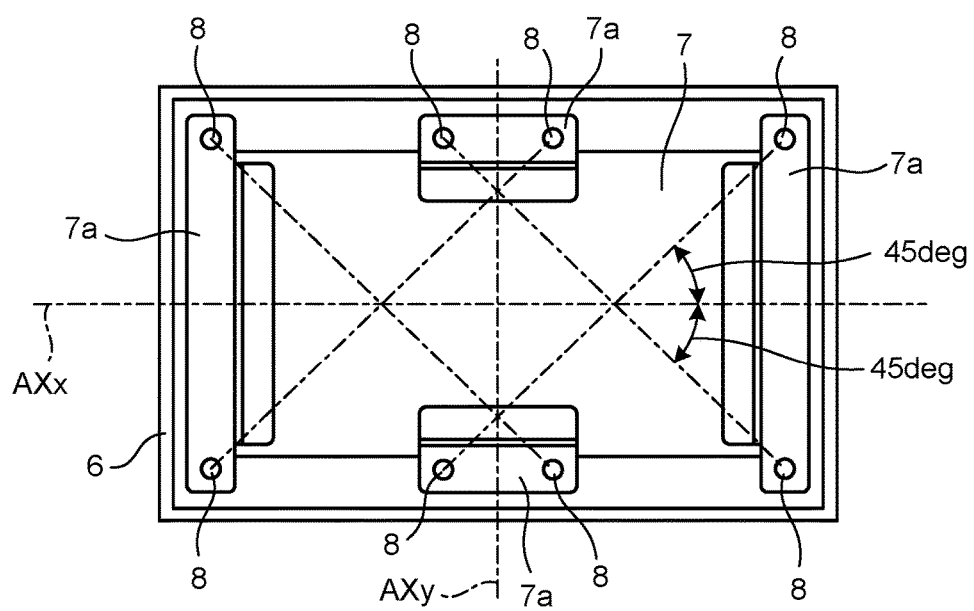
FIG. 4 is a rear view illustrating a holder according to the embodiment.

FIG. 4 is a rear view illustrating the holder according to the embodiment. As illustrated in FIG. 4, in a periphery portion of a back surface of the holder 7, the fixing plates 7a are arranged in respective four parts. Specifically, the fixing plates 7a are arranged on a reverse face of the holder 7 along both ends in a longitudinal direction of the holder 7, and the fixing plates 7a are arranged on the reverse face of the holder 7 at centers of respective both ends in a lateral direction of the holder 7.

Each of the fixing plates 7a is provided with a hole into which the screw 8 is inserted. The holes into which the screws 8 are inserted are arranged in parts where straight lines (thin dashed lines illustrated in FIG. 4) that form an angle of 45° by a light transmission axis AXx of the back polarizing plate 32 and a light transmission axis AXy of the front polarizing plate 33 intersect with a periphery portion of the holder 7.

The holder 7 and the exterior panel 6 are fastened to each other by the screws 8 that are inserted into the holes of the fixing plates 7a. Therefore, change in a 45 degree direction with respect to the light transmission axes AXx and AXy is reduced, so that the liquid-crystal display module 3 is capable of preventing display unevenness when a black screen is displayed.

It is preferable that an angle between a straight line that connects holes into which the screws 8 are inserted and crosses the holder 7 and the light transmission axes AXx and AXy is 45°; however, as long as the angle is within a range of 45°±5°, the liquid-crystal display module 3 is capable of preventing display unevenness when a black screen is displayed to the extent that there presents no visual problem.

As long as an extending direction of a straight line that connects holes into which the screws 8 are inserted and crosses the holder 7 is different from extending directions (light-transmitting axis directions) of the light transmission axes AXx and AXy, the liquid-crystal display module 3 is capable of reducing display unevenness when a black screen is displayed to some extent.

Herein, the case has been explained in which the holder 7 and the exterior panel 6 are fastened to each other by the screws 8 at all of the plurality of fixing parts; however, fixing with the use of a snap-fit may be performed for a part of all of the fixing parts at which fastening with the use of the screw 8 is unable to be performed due to limitations of space.

Figure 5:
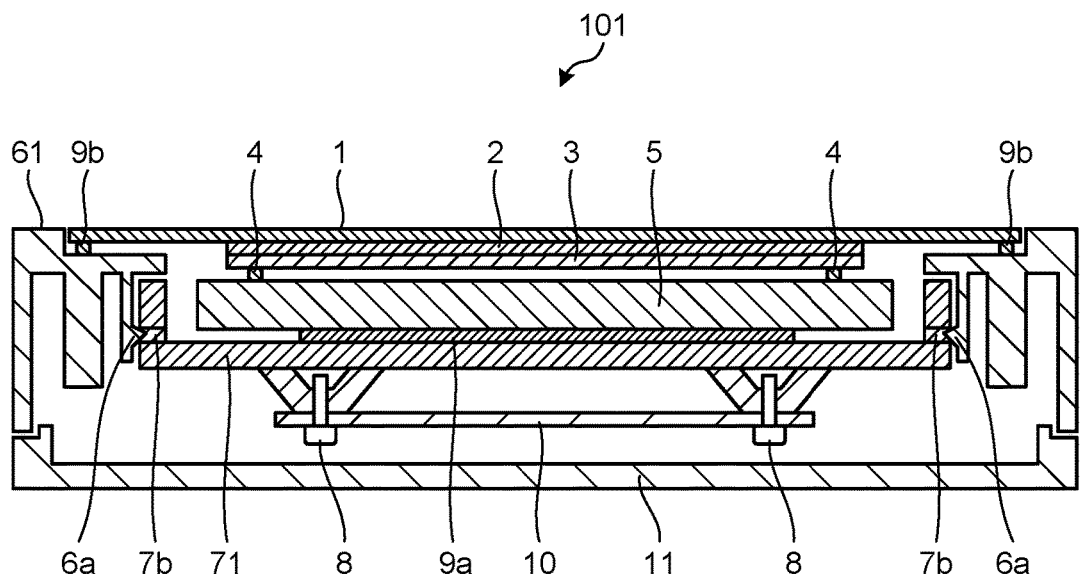
FIG. 5 is a side-cross-sectional view illustrating a liquid crystal display device according to a modification of the embodiment.
Figure 6:
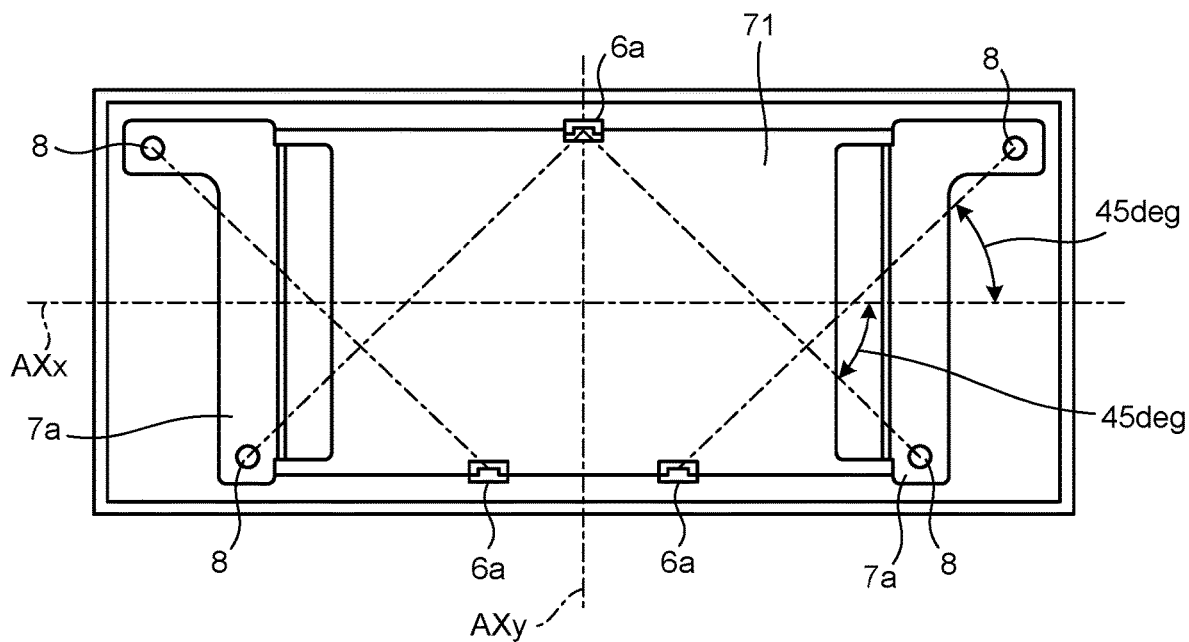
FIG. 6 is a rear view illustrating a holder according to the modification of the embodiment.

FIG. 5 is a side-cross-sectional view illustrating a liquid crystal display device according to a modification of the embodiment. FIG. 6 is a rear view illustrating a holder according to the modification of the embodiment. Among configuration elements of a liquid crystal display device 101 illustrated in FIGS. 5 and 6, configuration elements corresponding to those of the liquid crystal display device 100 illustrated in FIGS. 1 and 2 will be provided with the same reference symbols as those illustrated in FIGS. 1 and 2 to omit duplicated explanation.

As illustrated in FIG. 5, in the liquid crystal display device 101 according to the modification, a part of a plurality of fixing parts that fixes a holder 71 and an exterior panel 61 to each other is fixed with the use of a snap-fit. In the exterior panel 61, snap-fit fitting claws 6a are provided to an inner periphery surface of an opening via which the back light 5 is stored.

On the other hand, the holder 71 includes snap-fit fitting grooves 7b to be engaged with the snap-fit fitting claws 6a on an outer periphery surface thereof. In the liquid crystal display device 101, the snap-fit fitting claws 6a are engaged with the snap-fit fitting grooves 7b so as to fix the holder 71 and the exterior panel 61 to each other.

As described above, the liquid crystal display device 101 includes fixing parts having a snap-fit structure including the snap-fit fitting claws 6a and the snap-fit fitting grooves 7b. According to the liquid crystal display device 101, even in a case of a part in which fixing with the use of the screw 8 is not able to be performed due to limitations of space, the holder 71 and the exterior panel 61 are able to be fixed to each other with the use of a fixing part having a snap-fit structure.

As illustrated in FIG. 6, holes into which the screws 8 are inserted and the snap-fit fitting grooves 7b are provided to the liquid crystal display device 101 such that an angle between a straight line connecting the hole into which the screw 8 is inserted and the snap-fit fitting claws 6a and crossing the holder 71 and the light transmission axes AXx and AXy is 45°. Therefore, change in a 45 degree direction with respect to the light transmission axes AXx and AXy is reduced, so that the liquid-crystal display module 3 is capable of preventing display unevenness when a black screen is displayed.

It is preferable that an angle between a straight line connecting the hole into which the screw 8 is inserted and the snap-fit fitting claw 6a and crossing the holder 71 and the light transmission axes AXx and AXy is 45°; however, as long as the angle is within a range of 45°±5°, the liquid-crystal display module 3 is capable of preventing display unevenness when a black screen is displayed to the extent that there presents no visual problem.

As long as an extending direction of a straight line that connects holes into which the screws 8 are inserted and crosses the holder 71 is different from extending directions (light-transmitting axis directions) of the light transmission axes AXx and AXy, the liquid-crystal display module 3 is capable of reducing display unevenness when a black screen is displayed to some extent.

Figure 7:
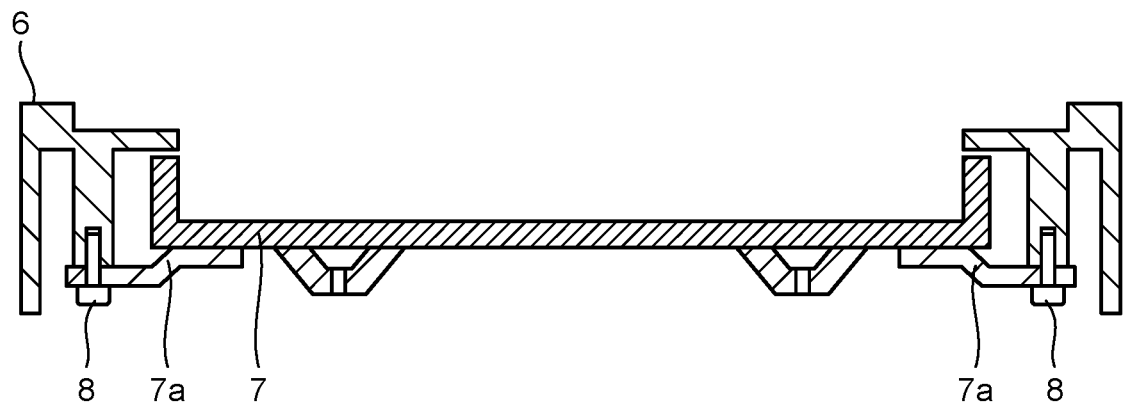
FIG. 7 is a diagram illustrating an assembly process of the liquid crystal display device according to the embodiment.
Figure 8:
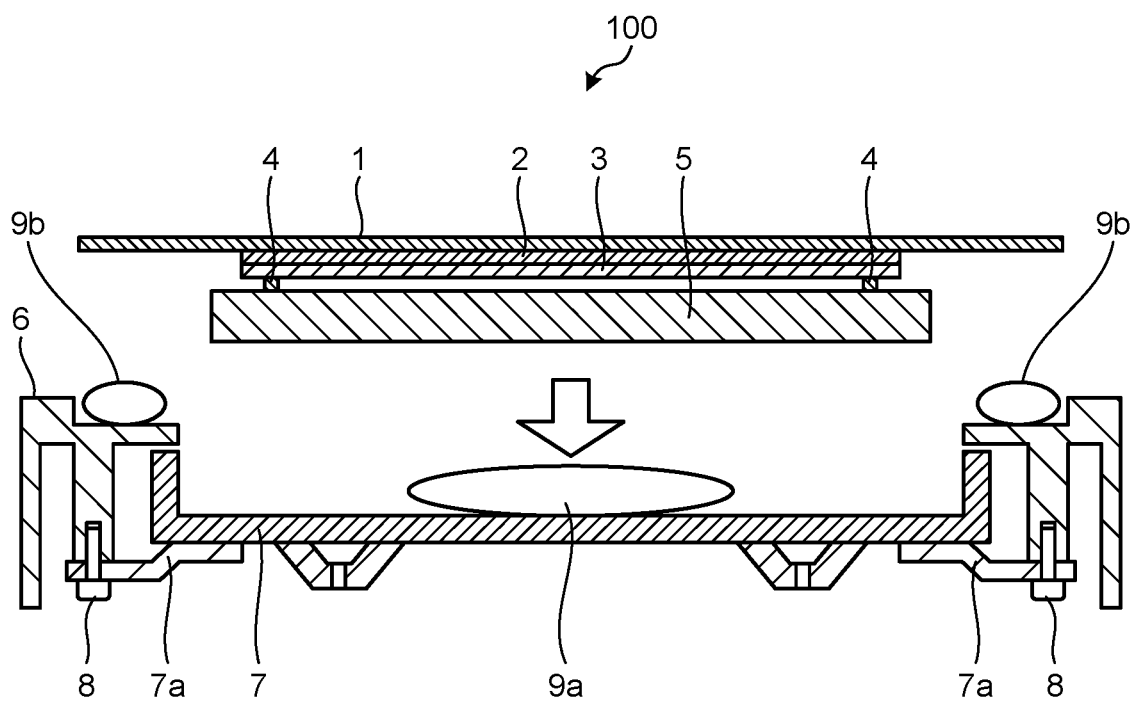
FIG. 8 is a diagram illustrating an assembly process of the liquid crystal display device according to the embodiment.

Next, an assembly process of the liquid crystal display device 100 will be explained with reference to FIGS. 7 and 8. FIGS. 7 and 8 are diagrams illustrating assembly processes of the liquid crystal display device according to the embodiment. As illustrated in FIG. 7, in the assembly process of the liquid crystal display device 100, the holder 7 and the exterior panel 6 are previously fastened to each other with the use of screws.

Thus, for example, in a state where an unnecessary warpage has occurred in the exterior panel 6 that is formed of a resin, the unnecessary warpage of the exterior panel 6 is able to be corrected in a process for fastening the exterior panel 6 to the high-rigidity holder 7 by the screws 8. Effects of the above-mentioned correction of the warpage will be mentioned later with reference to FIGS. 9 to 12.

Next, as illustrated in FIG. 8, the adhesive layer 9a is formed in a placed position of the back light 5 in the holder 7, and further the adhesive layer 9b is formed in a placed position of the cover glass 1 in the exterior panel 6. A structure obtained by sequentially laminating the cushion-base-material double sided tape 4, the liquid-crystal display module 3, the transparent adhesive layer 2, and the cover glass 1 on a front side of the back light 5 is inserted via an opening of the exterior panel 6, and then the back light 5 is glued and fixed to the holder 7.

Next, the substrate 10 is attached and fixed to a back side of the holder 7 with the use of the screws 8, and the back-surface panel 11 is finally attached to the back side of the holder 7 so as to complete assemblage of the liquid crystal display device 100 illustrated in FIG. 1.

Figure 9:
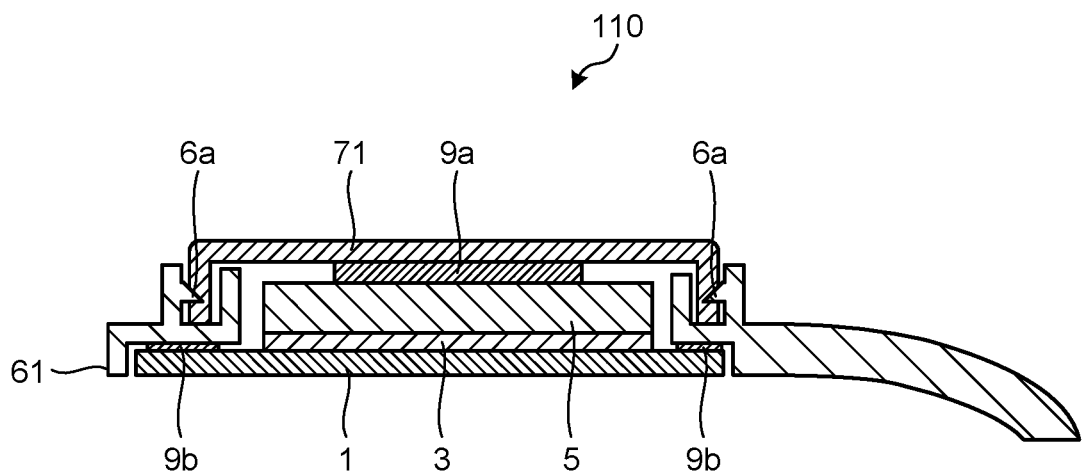
FIG. 9 is a diagram illustrating an assembly process of a liquid crystal display device according to a comparison example.
Figure 10:
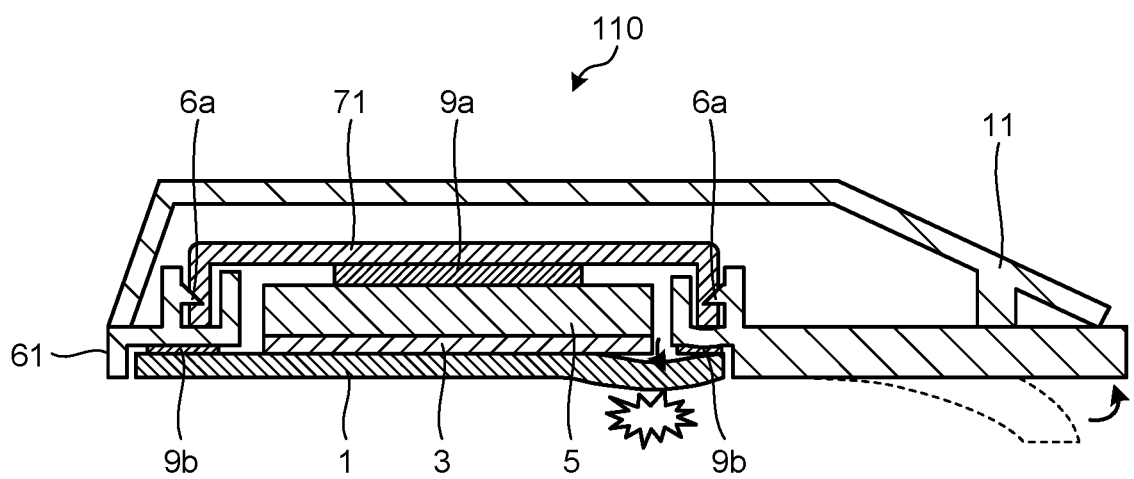
FIG. 10 is a diagram illustrating an assembly process of the liquid crystal display device according to the comparison example.
Figure 11:
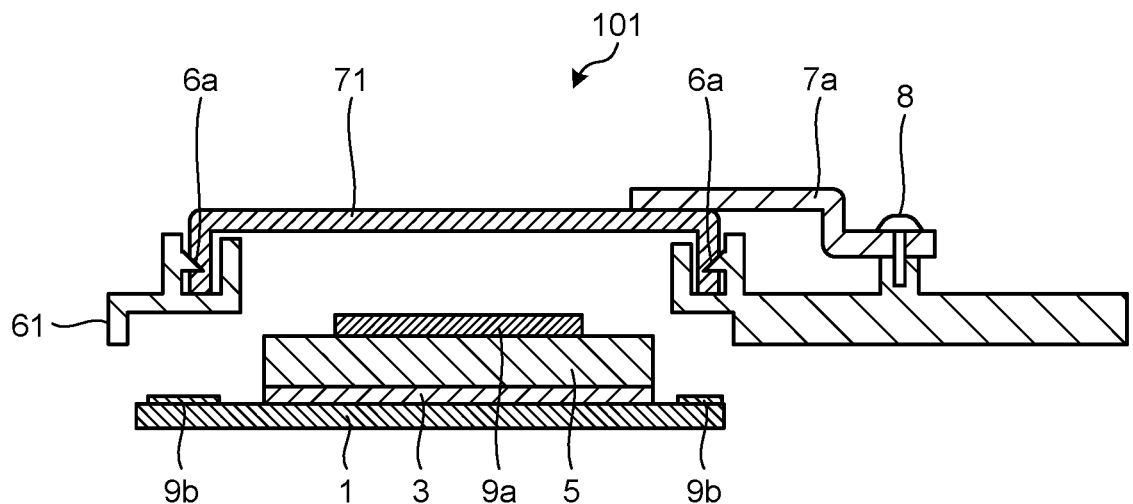
FIG. 11 is a diagram illustrating an assembly process of the liquid crystal display device according to the modification of the embodiment.
Figure 12:
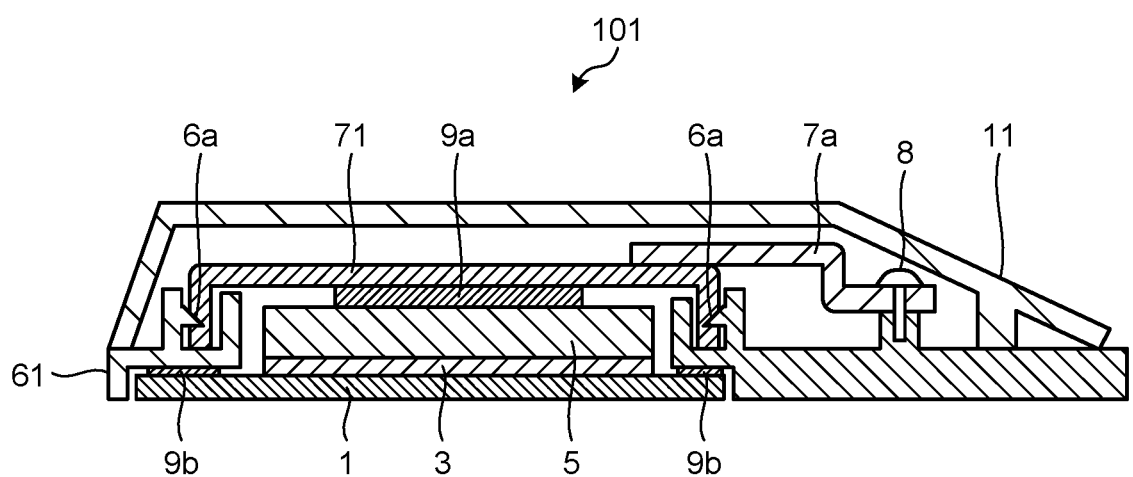
FIG. 12 is a diagram illustrating an assembly process of the liquid crystal display device according to the modification of the embodiment.

Next, effects achieved by previously correcting a warpage of the exterior panel will be explained with reference to FIGS. 9 to 12. FIGS. 9 and 10 are diagrams illustrating assembly processes of a liquid crystal display device according to a comparison example. FIGS. 11 and 12 are diagrams illustrating assembly processes of a liquid crystal display device according to the modification of the embodiment.

Among configuration elements of liquid crystal display devices 110 and 101 illustrated in FIGS. 9 to 12, configuration elements corresponding to those of the liquid crystal display device 101 illustrated in FIGS. 5 and 6 will be provided with the same reference symbols as those illustrated in FIGS. 5 and 6 to omit duplicated explanation.

As illustrated in FIG. 9, in the liquid crystal display device 110 according to the comparison example, the back light 5 to which the liquid-crystal display module 3 and the cover glass 1 are glued is attached to the holder 71 in a state where an unnecessary warpage of the exterior panel 61 is not corrected.

Next, as illustrated in FIG. 10, in the liquid crystal display device 110, for example, if the metallic back-surface panel 11 is fastened to a back surface of the exterior panel 61 having an unnecessary warpage, the unnecessary warpage of the exterior panel 61 is corrected by the back-surface panel 11. In this case, a snap-fit portion is deformed by a reactive force against correction of the warpage so as to deform the cover glass 1 of the exterior panel 61. In the liquid crystal display device 110, strain is generated in the liquid-crystal display module 3 due to the deformation of the cover glass 1, thereby leading to occurrence of display unevenness when a black screen is displayed.

On the other hand, as illustrated in FIG. 11, in the liquid crystal display device 101 according to the modification, the holder 71 and the exterior panel 61 are fastened to each other with the use of the screws 8 before the back light 5 to which the liquid-crystal display module 3 and the cover glass 1 are glued is attached to the holder 71. Thus, an unnecessary warpage of the exterior panel 61 is corrected.

Thus, as illustrated in FIG. 12, in the liquid crystal display device 101, for example, even if the metallic back-surface panel 11 is fastened to a back surface of the exterior panel 61 thereafter, a warpage of the exterior panel 61 has been already corrected, and thus the cover glass 1 is not deformed. Therefore, in the liquid crystal display device 110, strain is not generated in the liquid-crystal display module 3, so that it is possible to prevent occurrence of display unevenness when a black screen is displayed.

The above-mentioned embodiment is merely one example, and various modification is available. For example, shapes of the exterior panels 6 and 61 are left and right asymmetry or up and down asymmetry in some cases. In this case, a portion of the exterior panels 6 and 61 in which a warpage easily occurs may be fixed to the holders 7 and 71 with the use of the screws 8, and a portion of the exterior panels 6 and 61 in which a warpage hardly occurs may be fixed to the holders 7 and 71 with the use of a snap-fit structure.

Thus, in the process for previously fixing the exterior panels 6 and 61 and the holders 7 and 71 to each other, a warpage of the exterior panels 6 and 61 is able to be corrected by fastening of the screws 8, and further the number of the screws 8 to be used is able to be reduced so as to reduce the manufacturing cost.

As long as fixing parts between the exterior panels 6 and 61 and the holders 7 and 71 are those illustrated in FIGS. 4 and 6, a fixing method is not limited to fixing with the use of the screws 8. For example, an arbitrary fixing method such as staking and welding may be employed for a fixing method between the exterior panels 6 and 61 and the holders 7 and 71.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A liquid crystal display device comprising:
a liquid-crystal display module that includes a liquid-crystal panel and a polarizing plate;
a holder that holds a back light that is glued to a back surface of the liquid-crystal display module;
an exterior panel that surrounds a periphery of the liquid-crystal display module; and
a plurality of fixing parts that fixes an outer peripheral portion of the holder and the exterior panel to each other, wherein
the plurality of fixing parts includes a first fixing part using a screw and a second fixing part using a snap-fit, and
in a plan view of the liquid-crystal display module, a straight line passing through the first and second fixing parts across a surface of the liquid-crystal display module extends in a direction that is different from a light-transmission-axis direction of the polarizing plate.

2. The liquid crystal display device according to claim 1, wherein
an angle between the straight line and the light-transmission-axis direction is within a range of 45°±5°.

3. The liquid crystal display device according to claim 1, wherein
the plurality of fixing parts includes:
a fixing plate that is arranged on a periphery portion of the holder and that includes a hole into which a male screw portion of the screw is inserted; and
a female screw portion that is arranged in the exterior panel and to which the male screw portion of the screw is inserted.

4. The liquid crystal display device according to claim 3, wherein
the fixing plate is provided integrally with the holder.

5. The liquid crystal display device according to claim 3, wherein
the fixing plate is provided separately from the holder.

6. The liquid crystal display device according to claim 1, wherein
in a state where a shape of the exterior panel is left and right asymmetry or up and down asymmetry, a part of the exterior panel in which a warpage easily occurs is fixed to the holder by using the screw and a part of the exterior panel in which a warpage hardly occurs is fixed to the holder by using the snap fit.

7. An assembly method of a liquid crystal display device the method comprising:

fixing to each other with a plurality of fixing parts that includes a first fixing part using a screw and a second fixing part using a snap-fit, (i) a holder, which holds a back light arranged on a back surface of a liquid-crystal display module, and (ii) an exterior panel, which surrounds a periphery of the liquid-crystal display module, so that, in a plan view of the liquid-crystal display module, a straight line passing through the first and second fixing parts across a surface of the liquid-crystal display module extends in a direction that is different from a light-transmission-axis direction of the polarizing plate; and after the fixing, gluing a back surface of the back light to the holder, a front surface of the back light having been glued to the liquid-crystal display module.

8. The liquid crystal display device according to claim 1, wherein in the plan view of the liquid-crystal display module, the liquid-crystal display module has a rectangular shape, and the second fixing part using the snap-fit is arranged on a longer side of the rectangular shape.

9. The liquid crystal display device according to claim 1, wherein the straight line passes through the first fixing part using the screw and the second fixing part using the snap-fit.

10. The liquid crystal display device according to claim 2, wherein the straight line passes through a pair of the second fixing parts using the snap-fit.

* * * * *